United States Patent [19]

Jain et al.

[11] Patent Number: 5,539,682
[45] Date of Patent: Jul. 23, 1996

[54] SEED GENERATION TECHNIQUE FOR ITERATIVE, CONVERGENT DIGITAL COMPUTATIONS

[75] Inventors: Himanshu Jain; Charles C. Stearns, both of San Jose, Calif.

[73] Assignee: LSI Logic Corporation, Milpitas, Calif.

[21] Appl. No.: 175,497

[22] Filed: Dec. 30, 1993

Related U.S. Application Data

[63] Continuation of Ser. No. 926,469, Aug. 7, 1992, abandoned.

[51] Int. Cl.⁶ .................................. G06F 7/00; G06F 7/38; G06F 7/52
[52] U.S. Cl. ...................... 364/715.01; 364/752; 364/765
[58] Field of Search .................. 364/715.01, 718, 364/719, 720, 721, 729, 735, 736, 751, 752, 753, 754, 761, 764, 765

[56] References Cited

U.S. PATENT DOCUMENTS

| | | | |
|---|---|---|---|
| 4,707,798 | 11/1987 | Nakano | 364/765 |
| 4,823,301 | 4/1989 | Ghierim | 364/765 |
| 5,012,438 | 4/1991 | Yamaguchi | 364/765 |

*Primary Examiner*—Roy N. Envall, Jr.
*Assistant Examiner*—Chuong D. Ngo
*Attorney, Agent, or Firm*—Honigman, Miller, Schwartz and Cohn

[57] ABSTRACT

A novel technique for improving the accuracy of seed values for iterative convergent computations such as square-root taking and division by providing optional dynamic range expansion as a part of the seed selection process is described. The technique, by improving seed accuracy, reduces the number of iterations required for convergence. This is accomplished with less hardware than would be required to accomplish the same result with a large ROM.

9 Claims, 3 Drawing Sheets

PRIOR ART

5,539,682

SEED GENERATION TECHNIQUE FOR ITERATIVE, CONVERGENT DIGITAL COMPUTATIONS

CROSS-REFERENCE TO RELATED APPLICATIONS

This is a continuation of commonly-owned U.S. patent application Ser. No. 07/926,469, filed Aug. 7, 1992 now abandoned.

TECHNICAL FIELD OF THE INVENTION

The invention relates to digital numeric processing systems, and more particularly to high-performance digital floating-point and integer numeric processors which perform iterative calculations.

BACKGROUND OF THE INVENTION

Many of today's high-performance digital computing systems incorporate some form of digital numeric processor capable of division and square-root taking. Such calculations are generally performed by an iterative convergent process such as that depicted in FIG. 1.

FIG. 1 shows a generalized technique 100 for performing an iterative convergent calculation comprising an input multiplexer 110, and computing blocks 120 and 130, each having two inputs and one output. Multiplexer 110 selects between two input values: an initial value (or "seed") 140 and a feedback value 180 (which is the output of computing block 130) and presents the selected input value as its output value 190. (Multiplexer 110 is a conceptual device in this representation, and merely represents the ability to select between two values, which may be accomplished by any suitable technique).

Computing block 120 operates on its two input values "X" 190 and "P2" 160 and produces an output value "Y" 170 according to the expression Y=F(X,P2). "P2" 160 is representative of one or more external parameters values. Similarly, computing block 130 operates on its input values "Y" 170 and "P1" 150 producing the output value "Z" 180 according to the expression Z=G(Y,P1). "P1" 150 is representative of one or more external parameters values. This computing apparatus 100, as shown, forms an iterative calculation loop along the path defined by multiplexer 110, value "X" 190, computing block 120, value "Y" 170, computing block 130, and value "Z" 180.

As previously stated, FIG. 1 represents a generalization of simple iterative calculation techniques, and is not necessarily physically representative of any particular hardware implementation of these techniques. Numerous implementations of numeric processors capable of performing iterative calculations according to the generalized technique of FIG. 1 are well known in the prior art, and may be readily implemented by one skilled in the art.

Taking, for example, the problem of taking a square root of a number by an iterative computation, the technique of FIG. 1 may be applied. Several commonly used algorithms are suitable for this purpose, including: Newton's method, the Newton-Raphson method, and the Goldschmidt algorithm; all iterative convergent techniques which may be represented by the technique of FIG. 1. The simplest (though least efficient computationally) of these is Newton's method. The Newton-Raphson method and Goldschmidt algorithm are similar techniques which converge faster (in fewer iterations and/or with fewer calculations per iteration). Newton's method, however, is easiest to describe and is exemplary of these iterative methods.

Newton's method, as applied to the taking of square roots may be described as follows:

$$G_n = \frac{1}{2}\left(G_o + \frac{Q}{G_o}\right)$$

where "Q" is the value whose square root is to be taken, "$G_o$" is the last guess (old guess) at the square root, and "$G_n$" is the next guess at the square root. Each successive guess "$G_n$" closer approximates the square root of "Q". In order to apply this method to the apparatus of FIG. 1, "P1" 150 is set equal to the value of the number "Q" whose square root is to be taken, computing block 130 is set up such that:

$$G(Y, P1) = \frac{1}{2}(Y + P1/Y)$$

and computing block 120 is set up such that:

$$F(X, P2) = X$$

effectively eliminating computing block 120 (it is not needed for this particular calculation).

Note that for this type of calculation, an initial guess or "seed" 140 is required. For the first iteration, multiplexer 110 is set to use the "seed" 140 as its output 190. For all other iterations, multiplexer 110 is set to use the result of the last iteration 180 "Z" as its output 190 "X". Each iteration brings the computed value of the next guess 180 "Z" closer to the actual square root of the value "P1" 150. (Since the multiplexer is set to use "Z" 180 as its output "X" 190, and since computing block 120 is set to simply copy that signal to its output value "Y" 170, "Y" 170 also represents the result of the iterative calculation.) The closer the initial "seed" value 140 is to the square root of "P1" 150, the fewer iterations it takes to converge.

Typically, "convergence" is determined by one of a few methods, including:

1) Successive guesses $G_n$ are compared until the difference between them falls within a pre-specified tolerance range, at which point iterations are terminated and the last guess is taken as the result of the iterative computation;

2) Successive guesses $G_n$ are squared in an attempt to recreate the input operand "Q" on "P1" until $Q-G_n^2$ falls within a certain tolerance range, at which point iterations are terminated and the last guess is taken as the result of the computation; or 3) A fixed number of iterations is executed, where the number of iterations is chosen according to a worst-case analysis of the number of iterations required to provide a result of sufficient accuracy.

For any such iterative technique, an initial seed value is required. Ultimately, the better the seed selection process, the fewer the number of iterations required for the computation to converge. Generally, a seed value that starts the iterative computation process somewhere "in the ballpark" of the ultimate result will provide good performance. One commonly used technique for selecting seed values is shown in FIG. 2. Apparatus 200 for selecting a seed value 230 comprises a Read-Only Memory (ROM) 210 connected such that selected bits 220a (the most significant bits, or MSB's) of an input operand 220 are presented to the input of the ROM (the address inputs). A set of seed values are stored in the ROM according to the magnitude of the value of their address. The addressed seed value 230 is then used as the initial value for the iterative computation.

Typically, due to space and cost considerations, the ROM is a small one. Take, for example, the case where a 19 bit input operand is used in conjunction with a 256 by 8 bit ROM. If such a ROM is used, the 8 most significant bits of the input operand are used as the address input of the ROM. The output of the ROM only provides 8 bits, so this 8 bit seed value is typically used as the most significant 8 bits of a 19 bit seed value, the remainder of which seed value is padded with zeroes or ones. In this manner, one of 256 seed values is supplied according to the magnitude of the input operand.

One method of improving the initial selection of seed values is simply to provide a larger ROM which stores more seed values and/or more bits per seed value. However, this technique is generally not practical, due to the large size of the ROM which would be required. (In the extreme, a single ROM containing full precision results for each operand value could be provided, eliminating the need for iterative calculations at all, but this is extremely disadvantageous from a cost/size point of view.)

However, the results of square root operations are not linearly proportional to the value of the input operand, but are logarithmically related to the magnitude of the input operand. Ideally, a technique for selecting seed values for square root computations would provide for finer resolution where successive values are closely spaced, and coarser resolution where successive values are widely spaced. On the other hand, for some calculations, linear spacing of seed values is desirable. In these cases, variable resolution is disadvantageous.

It is known in the prior-art to expand the dynamic range of seed values by taking a raw seed value and squaring it via the same multiplier circuitry which forms a part of the iterative computation mechanism to create an expanded seed value, but this technique ties up the iterative computation mechanism for additional cycles, thereby negating at least some of the savings in iterations which would be realized by improving the dynamic range of the seed value.

An ideal seed selection technique would allow for linear or variable resolution seed selection, while minimizing the amount of ROM and/or total circuitry required to accomplish this. Unfortunately, prior art seed selection techniques do not provide this capability.

DISCLOSURE OF THE INVENTION

It is therefore an object of the present invention to provide a technique for selecting seed values according to the magnitude of an input operand, whereby improved initial seed accuracy is realized.

It is a further object of the present invention to provide a technique for selecting seed values according to the magnitude of an input operand which minimizes the size of the ROM required.

It is a further object of the present invention to provide a technique for selecting seed values according to the magnitude of an input operand by a variable resolution scheme for iterative computations which benefit from variable resolution seed selection.

It is a further object of the present invention to provide a technique for selecting seed values according to the magnitude of an input operand by a linear resolution scheme for iterative computations which benefit from linear resolution seed selection.

It is a further object of the present invention to provide a technique for accomplishing the above objectives with a single set of seed selection hardware.

According to the invention, a ROM is provided, having address inputs, data outputs, and a plurality of data storage locations, where the address inputs of the ROM are connected to selected bits (preferably the most significant bits) of a binary input operand, thereby selecting one ROM data storage location for a range of input operand values. These selected bits of the binary input operand select one of a set of seed values encoded into the ROM, which selected seed value is presented at the data output of the ROM. The output of the ROM is connected to the input of a dynamic range expansion circuit, which provides an output value having more bits of resolution than its input value. Each seed value in the ROM is encoded such that the dynamic range expander output value resulting from processing that seed value is approximately the desired result of the iterative calculation for the middle of the range of input operands which select that seed value. This dynamic range expander output is then used as the initial value (expanded seed) for a subsequent iterative computation based on the binary input operand.

In one embodiment of the invention, the dynamic range expansion circuit is provided by a digital binary multiplier having two operand inputs and one product output, such that both of its operand inputs are connected to the output of the ROM. In this manner, the dynamic range expansion is provided by squaring the seed value at the output of the ROM.

In another embodiment, a two-input multiplexer is additionally provided whereby one input of the multiplexer is connected to the data output of the ROM via a padding circuit and the other input of the multiplexer is connected to the output of the dynamic range expander. The padding circuit pads the ROM output with ones and/or zeroes out to a binary width equal to that of the expanded seed value produced by the dynamic range expander. This width is chosen to match the computational width of subsequent calculation hardware. A selection signal controls the multiplexer according to the type of seed value desired such that for iterative computations (such as division) which benefit from linear (or nearly linear) spacing of seed values the (padded) non-expanded seed value from the ROM will be used, and for iterative calculations (such as square-root taking) which benefit from exponential (or otherwise range-expanded) spacing of seed values the output of the dynamic range expander will be used.

In still another embodiment, one or more additional address input signals are provided to the ROM such that different regions of the ROM may be selected, providing different sets of seed values for different types of iterative computations.

Other objects, features and advantages of the invention will become apparent in light of the following description thereof.

DETAILED DESCRIPTION OF THE INVENTION

Prior-art techniques for seed selection do not permit optimization of the dynamic range of seed values. The technique describe herein provides for an improved seed selection technique whereby the dynamic range of desired seed values may be used to advantage in minimizing the amount of ROM storage and hardware required for accurate seed selection.

Figure 1:
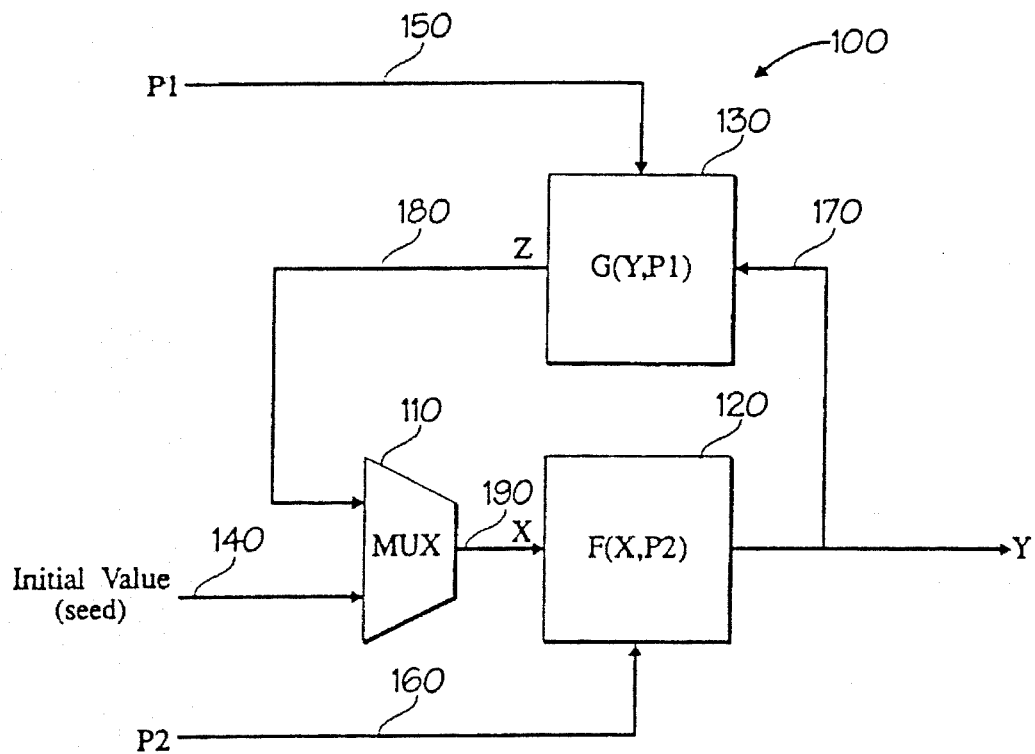
FIG. 1 is a diagram of a generalized prior-art technique for performing iterative computations.
Figure 2:
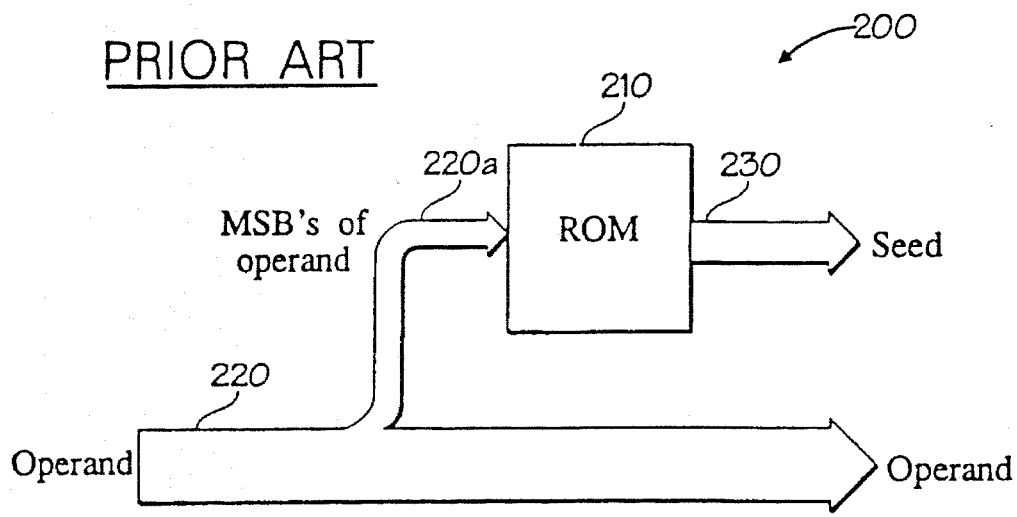
FIG. 2 is a diagram of a prior-art technique for selecting seed values according to the magnitude of an input operand.
Figure 3:
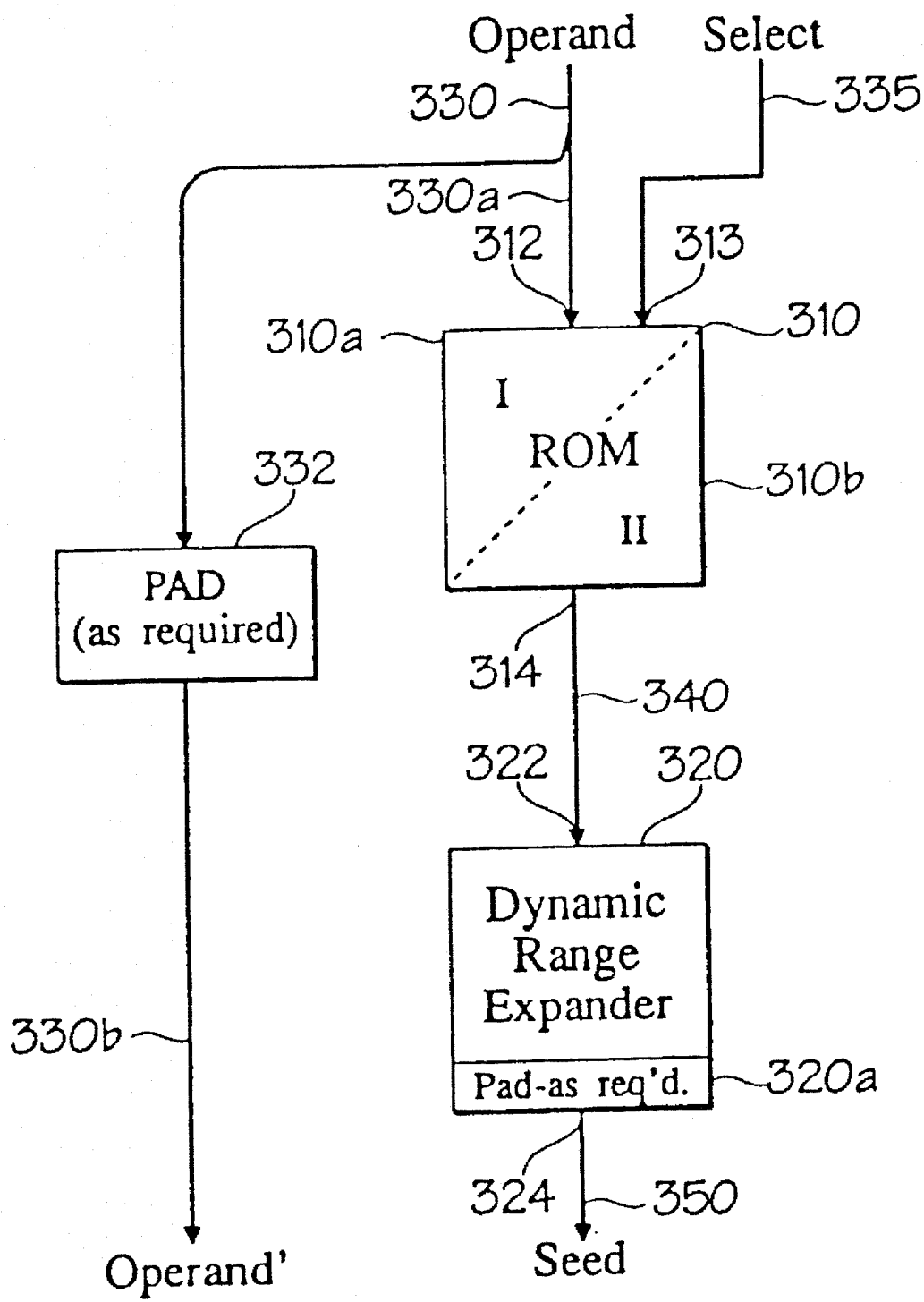
FIG. 3 is a block diagram of an technique for selecting seed values with expanded dynamic range, according to the present invention.

FIG. 3 shows a seed selection technique, according to the present invention, wherein an input operand 330 which is to be operated upon by a subsequent iterative computation process (not shown) is used to select a seed value 350. The entire input operand 330 is applied to the subsequent iterative computation process (possibly padded with ones and/or zeroes to a greater number of significant bits by a padding process 332, as necessary to match an input precision requirement of the subsequent iterative computation process) as an input value 330b ("Operand'"). A selected portion 330a of the input operand 330, preferably the most significant bits of the operand, is used as a "seed selector" and is connected to address inputs 312 of a ROM 310, which serves as a look-up table for "raw" (or linearly encoded) seed values, with one "raw" seed value stored in each location of the ROM. If more than one iterative algorithm can be executed by the subsequent iterative computation necessitating selection of different seed values for each algorithm, then additional address inputs 313 of ROM 310 may be connected to one or more set select signals 335 (one shown), thus effectively creating two or more "regions" (two shown: 310a and 310b) for storing separate sets of seed values, one set in each such region. Set select signal 335 (if used) indicates which algorithm (or set of algorithms using common seed values) is to be executed by the subsequent iterative computation process and which set of seed values is to be used, and selects one of the regions (e.g., 310a or 310b) containing a set of seed values in ROM 310. Each data storage location in ROM 310 addressable by the address inputs 312 and 313 contains a "raw" seed value corresponding to the values of seed selector 330a and set select signal(s) 335 which select it. The signal 340 at the output 314 of ROM 310 represents the seed value addressed by the seed selector 330a. Since seed selector 330a comprises only a portion of the (preferably most significant) bits of binary input operand 330, each value of seed selector 330a occurs for a range of values of the binary input operand 330, and each "raw" seed value selected by seed selector 330a, is therefore applicable to a like range of values of the binary input operand 330.

The output signal 340 of ROM 310, containing the selected seed value, is applied to the input 322 of a dynamic range expander 320, such as a squaring circuit, which expands the dynamic range of the input seed value providing a seed ("Seed") output signal 350 at its output 324. Dynamic range expander 320 also includes padding 320a, as required to match the bit resolution of its output 324 to the input resolution of the subsequent iterative computation process. It is this seed output signal 350 which is used as the initial value for the subsequent iterative computation process.

A "squaring circuit" as suggested above for use as a dynamic range expander, may be constructed from a digital multiplier having two operand inputs and a product output by connecting both operand inputs to the same signal, effectively creating a single input. The product output will then be the product of the input value times itself: the square of the input signal. Although the multiplier itself has two operand inputs, its application as a dynamic range expander has only one input, since there is only one input value applied to both inputs of the multiplier.

As described hereinabove, ROM 310 stores one seed value per storage location. One skilled in the art will recognize that a number of alternative variations of this theme exist, including:

1) Use of a "wide" ROM wherein more than one "raw" seed value is stored in each location, such that a portion of the seed selector 330a is used to select a ROM storage location, while another portion of seed selector 330a is used to control a multiplexer or other selection circuit to select which "raw" seed value in the selected ROM storage location is used;

2) Use of a "wide" ROM wherein more than one "raw" seed value is stored in each location, and where seed selector 330a is used to select a ROM storage location, and set select signal(s) 335 is(are) used to control a multiplexer or other selection circuit to select which "raw" seed value in the selected ROM storage location is used; or 3) Use of a "narrow" ROM, in which seed values are stored in more than one ROM storage location, such that two or more accesses of ROM storage locations are required to retrieve a "raw" seed value.

It will also be recognized by one skilled in the art that other prior-art techniques may be used in combination with the technique described above, such as assuming that most significant bit in the raw seed value has a particular value, allowing seed values to be stored with this bit left off, in which case the "raw" seed value may be padded with the omitted bit value prior to processing by dynamic range expander 320.

"Raw" seed values are determined by choosing that value which, when processed by the dynamic range expander 320, produces a seed value 350 which minimizes the number of iterations required of the subsequent iterative computation process operating according to the algorithms or algorithms indicated by the set select signal 335 for the range of binary input operand values represented by the seed selector 330a value which selects that "raw" seed value in ROM 310.

This technique is particularly advantageous for iterative computations, such as square-root taking, which benefit from compressing the dynamic range of encoded seed values in the ROM 310 and subsequently expanding them. This technique is also particularly advantageous over a method which would simply expand the width of the ROM to provide seeds with greater dynamic range, since the requisite ROM would be significantly larger than the combination of the smaller ROM 310 and the dynamic range expander 320.

However, for some iterative computations, such as those used in certain iterative division algorithms, linear encoding provided better seed values. For computations such as these, the technique of FIG. 3 may actually provide a loss of effective seed resolution and therefore increase the number of iterations require. In response to this, FIG. 4 shows a further improved seed selection technique whereby either linear or dynamic range expanded seed selection may be accomplished depending upon the iterative algorithm to be applied.

Figure 4:
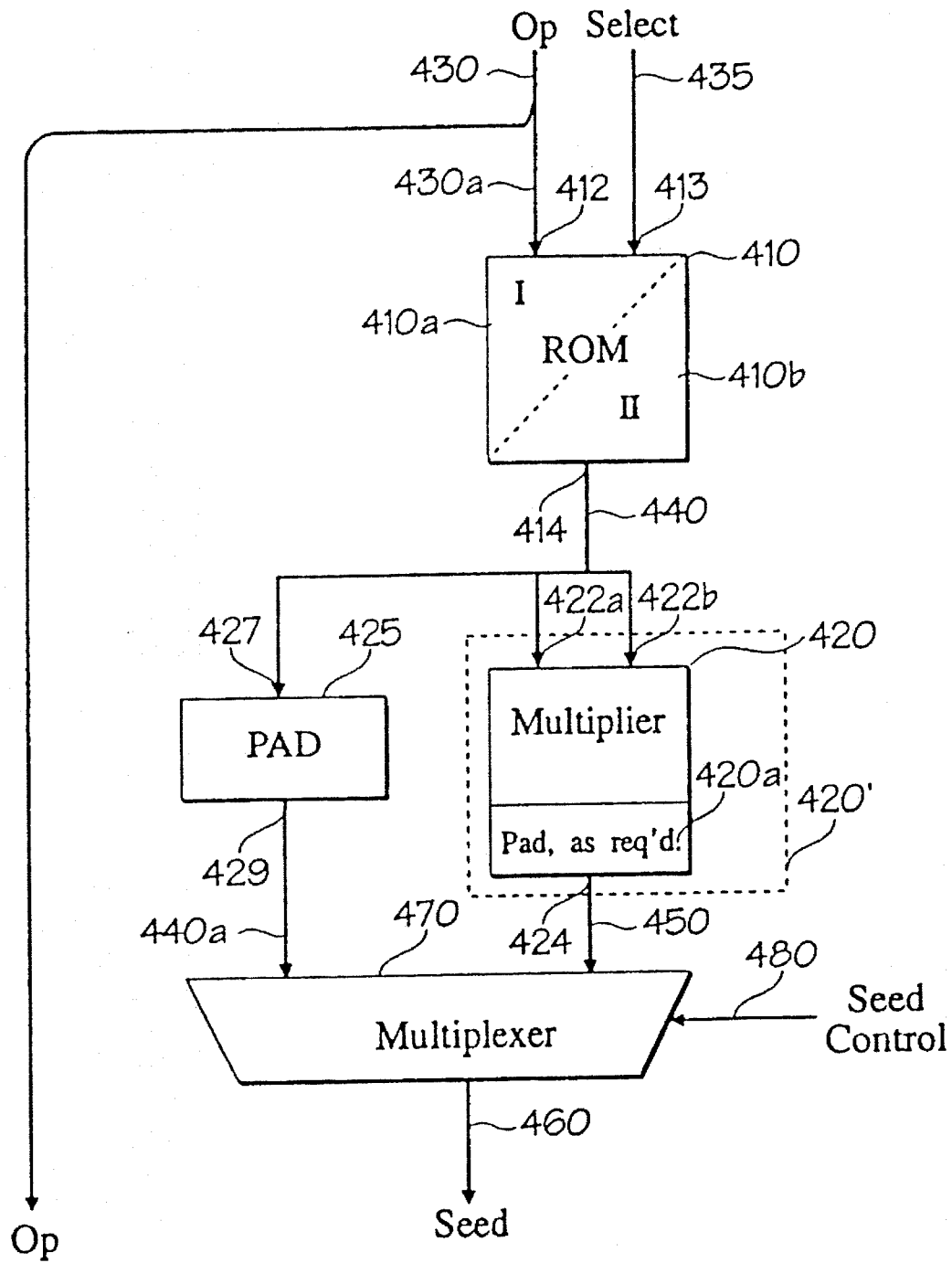
FIG. 4 is a block diagram of a technique for selecting seed values having either expanded or non-expanded dynamic range, according to the present invention.

In FIG. 4, an input operand 430 is to be operated upon by a subsequent iterative computation process (not shown) requiring an initial value (seed). A ROM 410 containing "raw" (linearly encoded) seed values and having address inputs 412 and 413, and data outputs 414 is provided. Selected bits of the input operand 430, preferably comprising a most significant subset of the input operand 430, are provided as a seed selector 430a, which is connected to a portion of the address inputs 412 of ROM 410. A remaining portion 413 of the ROM address inputs are connected to one or more select signals 435. Typically, the select signal(s) 435 are connected to the most significant address input bit(s) 413 of ROM 410 and the seed selector 430a is connected to the least significant address input bits 412, although the invention requires no specific grouping of address input bits. The seed value selected by the combination of seed selector 430a and select signal(s) 435 is presented at the output 414 of ROM 410 as a "raw" seed signal 440, which further connects to input 427 of a pad circuit 425 and to both inputs 422a and 422b of a multiplier circuit 420, such that multiplier 420 performs as a squaring circuit which acts as a dynamic range expander 420' (analogous to dynamic range expander 320 with respect to FIG. 3). Pad circuit 425 is provided for the purpose of padding (increasing the binary width or resolution by grouping with additional fixed one and/or zero bits) a binary input value of lower precision out to a precision equal to that of the multiplier 420 output. The output 429 of pad circuit 425 generates a padded output signal 440a, representing a padded version of ROM output 440, which is connected to one input of a two-input multiplexer 470, and the output signal 450 connected to the output 424 of multipliers 420 is connected to the other input of two-input multiplexer 470. A pad function 420a is provided in the output of multiplier 420 to match the width of the output 429 of pad circuit 425. A seed control signal 480 controls whether the "Seed" output 460 of multiplexer 470 is taken from the padded ROM output signal 440a or from the multiplier output 450. The select signal(s) 435 are be used to select different sets of seed values for different iterative algorithms, providing optimal seed values for each. If linear encoding of seed values is deemed desirable for a particular iterative algorithm, then seed control signal 480 is set to select the value of padded ROM output 440a on seed output 460. If, however, range expanded seed values are deemed desirable for a particular iterative algorithm, then seed control signal 480 is set to select multiplier output 450 on seed output 460.

It should be noted that signals 430, 430a, 440, 440a, 450 and 460 are all multi-bit signals, and their corresponding connections (412, 413, 414, 422a, 422b, 427, 429, 424, and the inputs and output of multiplexer 470) are all multi-bit inputs or outputs.

In a typical usage, operand 430 is 19 bits wide and seed selector 430a comprises the 9 most significant bits of operand 430 and is applied to the 9 least significant address input bits 412 of ROM 410. A one-bit set select signal 435 is used to indicate whether a divide algorithm or a square-root algorithm will be performed in the subsequent iterative computation process, and is applied to a tenth address input bit 413 of ROM 410. ROM 410, therefore, stores 1024 8-bit "raw" seed values in two 512 value sets. Dynamic range expander 420' is a 9 bit squaring circuit formed from a 9 by 9 multiplier 420 providing an 18 bit result, padded by pad function 420a to 19 bits. In this usage, a leading '1' bit is assumed on the "raw" seed values, which is not stored in ROM 410. The additional '1' bit is hardwired (not shown) to the 9th (most significant) input bit of the dynamic range expander 420. Pad circuit 425 pads the 8-bit "raw" seed value out to 19 bits by supplying the missing most significant '1' bit and filling the least significant bits with zeroes. Multiplexer 470 selects between the two 19 bit values at its input and presents the selected value at its output 460.

The combination of a 1024 by 8 ROM and a 9 by 9 parallel multiplier is considerably smaller (in gates) than the 1024 by 18 ROM which would be required to provide equivalent seed dynamic range without a dynamic range expander.

One skilled in the art will recognize that it is also possible to provide bit-padding at the output of the multiplexer, if this is necessary.

The techniques of the present invention are equally applicable to integer and floating-point applications. For floating-point applications, the technique is applied to the mantissa of the floating-point number after normalization. As an example, consider a floating-point square root. Two techniques are possible:

1) The exponent is examined. If it is odd, then the exponent is decremented (or incremented) by one and the mantissa is shifted one position to the left (or right). The exponent is then divided by two (shifted one position to the right—note that decrementing of the exponent is not necessary, since the least significant bit disappears when shifted to the right) and an iterative integer square root computation is performed on the mantissa, using the seed generation mechanism of the present invention.

2) If ever the exponent is left unmodified and is simply shifted to the right. The least significant bit of the exponent is provided as a select signal to one address input bit of the seed selector ROM of the present invention, such that different seed values will be used for odd and even exponent values. The mantissa is shifted appropriately before being applied to the iterative algorithm, but is not shifted at the seed selector ROM inputs.

In floating-point representations, elimination of an assumed leading '1' bit in the mantissa is common, so this must be taken into consideration in applying the techniques described herein.

By using the techniques described herein, it is possible to improve the accuracy of seeds selected for iterative computations. These techniques are flexible, being adaptable to both linear and expanded range seed selection, and require significantly less hardware than a large ROM provided for the same purpose.

What is claimed is:

1. A apparatus for selecting a seed value in one computation cycle for use by an iterative computation processor when solving a mathematical function on a multi-bit binary operand value, comprising:

a read only memory having an address input and a data output, said read only memory storing at least one set of a plurality of first seed values, each of the plurality of first seed values selected by a corresponding address value at the address input and available at said read only memory output;

said read only memory address input adapted to receive the corresponding address value which is a selected subset of the multi-bit binary operand value; and a dynamic range expander having an input and an output, said dynamic range expander input connected to said read only memory output and said dynamic range expander output adapted for connection to the iterative computation processor, wherein said dynamic range expander is a squaring circuit that processes the selected first seed value into a second seed value, and the second seed value is available at the output of said dynamic range expander for use by the iterative computation processor.

2. The apparatus according to claim 1, wherein:

the corresponding address value is the selected subset of the most significant bits of the multi-bit binary operand value.

3. The apparatus of claim 1, further comprising a corresponding address value which is a selected subset of the multi-bit binary operand value and a seed value set select control value.

4. The apparatus according to claim 3, further comprising:

means for selecting different sets of first seed values in said read only memory according to a seed value set select control value.

5. The apparatus of claim 1, further comprising:

a multiplexer having first and second inputs, an output and an input select control; and a binary number expander, said binary number expander adding selected bit positions and bit values to a binary number so as to increase its binary value;

said binary number expander connected between the output of said read only memory and the first input of said multiplexer, wherein the selected first seed value from the output of said read only memory is expanded to the same number of binary bits as is the second seed value from the output of said dynamic range expander;

said multiplexer second input connected to said dynamic range expander output, and said multiplexer output adapted for connection to the iterative computation processor, wherein said multiplexer input select control selects either the expanded selected first seed value or the second seed value for use by the iterative computation processor.

6. A method for selecting a seed value in one computation cycle for use by an iterative computation processor when solving a mathematical function on a multi-bit binary operand value, comprising the steps of:

deriving a corresponding address value from the multi-bit binary operand value;

selecting one of a plurality of first seed values stored in a read only memory, the one of a plurality of first seed values being selected by the corresponding address value connected to an address input of the read only memory and the selected one of a plurality of first seed values then being available at the read only memory output; and dynamically expanding the selected one of a plurality of first seed values with a squaring circuit, the expanded selected one of a plurality of first seed values being available for use by the iterative computation processor.

7. The method of claim 6, further comprising the step of deriving a corresponding address value from the multi-bit binary operand value and a seed value set select control value.

8. The method of claim 6, further comprising the steps of:

linearly expanding the selected one of a plurality of first seed values with a binary number expander which adds selected bit positions and bit values to a binary number so as to increase its binary value;

selecting between the dynamically expanded selected one of a plurality of first seed values from the dynamic range expander or the linearly expanded selected one of a plurality of first seed values from the binary number expander, the selected expanded seed value being available for use by the interative computation processor.

9. The method of claim 8, wherein the step of selecting between the dynamically expanded seed value and the linearly expanded seed value is determined by the subsequent iterative computation to be performed.

* * * * *